US006785368B1

(12) United States Patent
Eason et al.

(10) Patent No.: US 6,785,368 B1
(45) Date of Patent: Aug. 31, 2004

(54) ON-DEMAND CALLER IDENTIFICATION

(75) Inventors: Wendy Eason, Decatur, GA (US);
Anita Hogans Simpson, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/178,334

(22) Filed: Jun. 24, 2002

(51) Int. Cl.$^7$ ................................................ H04M 1/64
(52) U.S. Cl. ................ 379/88.19; 379/88.2; 379/88.21; 379/142.06; 379/207.14
(58) Field of Search ........................... 379/88.2, 88.21, 379/142.06, 207.14, 207.15, 210.01, 142.04, 88.19

(56) References Cited

U.S. PATENT DOCUMENTS 5,898,770 A * 4/1999 Valentine .................... 379/249
5,940,484 A * 8/1999 DeFazio et al. ........ 379/142.06
5,943,397 A * 8/1999 Gabin et al. ................ 379/67.1
5,974,128 A * 10/1999 Urban et al. ........... 379/221.09
6,041,112 A * 3/2000 Malik .................... 379/209.01
6,282,275 B1 * 8/2001 Gurbani et al. ........ 379/142.06

* cited by examiner

*Primary Examiner*—Fan Tsang
*Assistant Examiner*—Simon P Sing
(74) *Attorney, Agent, or Firm*—Merchant & Gould

(57) ABSTRACT

An on-demand caller ID service is disclosed. A customer dials an access code to retrieve calls made to his telephone number. An automated voicemail response system would repeat the telephone numbers and/or names associated with those telephone numbers that called over a predetermined time period, such as the last 24 hours. The customer is billed a per usage charge for each time he accesses the service. The customer may also subscribe to the service. Customers that are not subscribers of caller ID may utilize this service if they are seeking to track down an incoming call that may have been missed during the day. Also, customers who are away from their telephone line may remotely check who has called them by accessing the service.

26 Claims, 4 Drawing Sheets

ON-DEMAND CALLER IDENTIFICATION

FIELD OF THE INVENTION

This invention relates generally to telecommunications, and more particularly relates to a method and system for providing on-demand caller identification (caller ID) services.

BACKGROUND OF THE INVENTION

Caller identification (or caller ID) is a popular telecommunications service that allows a called party to view the name and/or telephone number associated with a calling party. Caller ID may be used to screen telephone calls in real-time or may be used to review a listing of calls received. For example, a caller ID subscriber may review a listing of names and/or telephone numbers of calls received while the subscriber was away from the telephone. Typically, the calling party name and/or telephone number is viewed on a caller ID box. Some telephones are also capable of displaying caller ID information.

A consumer that does not have caller ID service has few ways of tracking who calls his home over an extended period of time unless he performs a call back on the last dialed number (such as by using a *69 service). However, this is only effective for the last calling party number. If a consumer does not subscribe on a monthly basis to certain calling features, some telecommunications providers allow many calling features to be utilized on a per usage basis. For example, three-way calling and *69 service may be used on a per-use basis incurring a per usage charge on the consumer's phone bill.

Accordingly, there is a need for a per usage feature that allows caller ID service to be accessed and used on a per usage basis. It is with respect to these considerations and others that the present invention has been made.

SUMMARY OF THE INVENTION

In accordance with an embodiment of the present invention, the above and other problems are solved by an on-demand caller ID service. In one embodiment, the invention functions as follows. From his home phone, a customer dials an access code to retrieve calls made to his telephone number. An automated voice response system repeats the telephone numbers that called over a predetermined time period, such as the last 24 hours. The customer is billed a per usage charge for each time he accesses the service. Customers that are not subscribers of caller ID may utilize this service if they are seeking to track down an incoming call that may have been missed during the day. Also, customers who are away from their telephone line may remotely check who has called them by accessing the service.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

In accordance with an exemplary embodiment of the present invention, an on-demand caller ID system is provided. In embodiments of the present invention, caller ID may be used on a per-usage basis and charges may be billed to the customer on a per-usage basis.

Operating Environment

Figure 1:
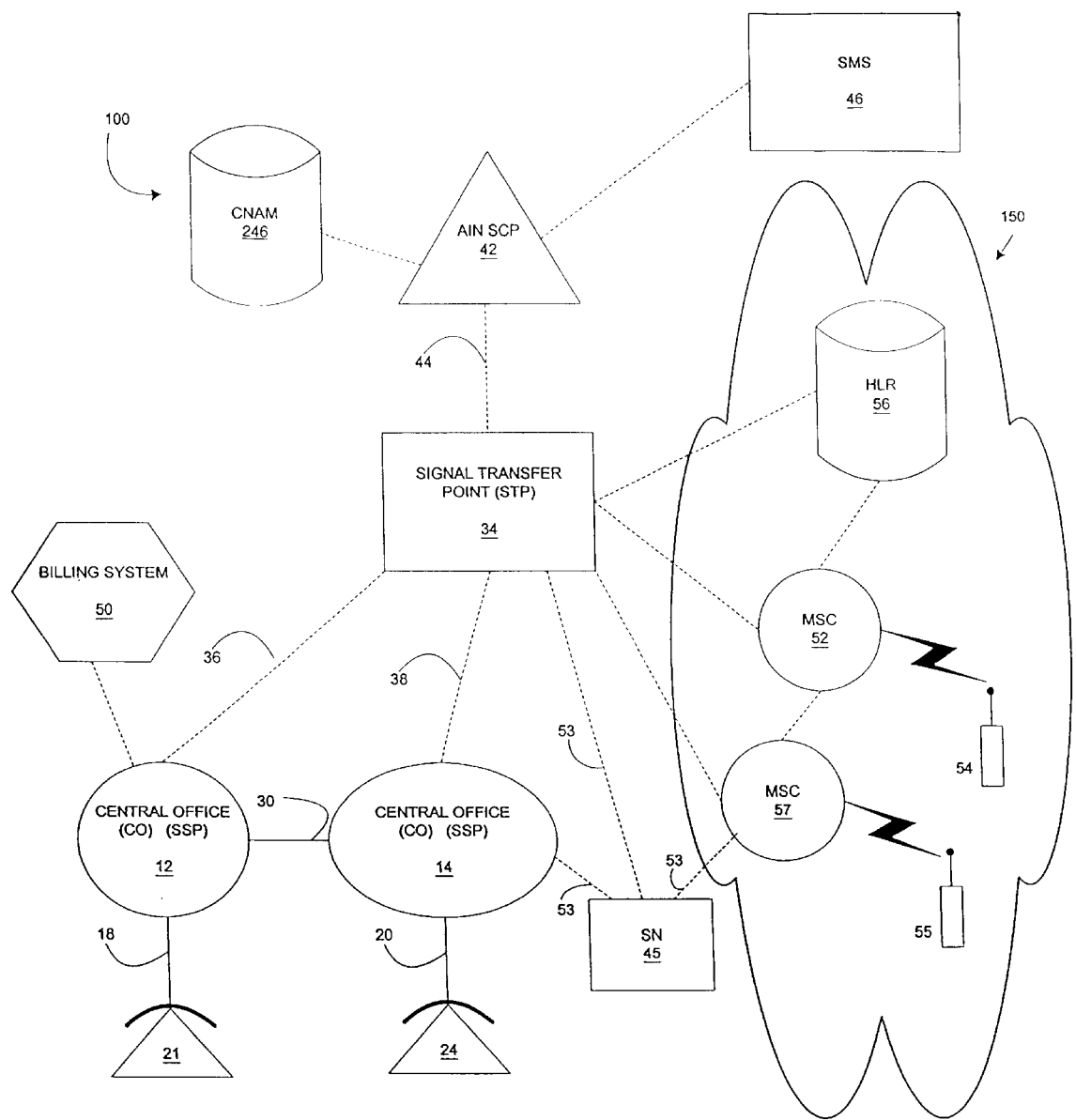
FIG. 1 is a block diagram illustrating components of a wireline and wireless telephone network that provides an exemplary operating environment for the present invention.

It is advantageous to describe an exemplary operating environment in which the current invention may reside. FIG. 1 is a block diagram illustrating components of a wireline and wireless telephone network that provides an exemplary operating environment for the present invention. Referring now to the drawings, in which like numerals represent like elements throughout the several figures, aspects of the present invention and the advanced intelligent network (AIN) and an integrated wireless network will be described.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 1, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as SCP 42, are physically implemented by relatively powerful fault tolerant computers. Among the functions performed by the service control points is maintenance of network databases used in providing enhanced services.

The environment may also include one or more service nodes 45. The service node may be used to implement functions such as voice-to-text and text-to-voice conversions, among other functions. Those skilled in the art are familiar with service nodes, which may be physically implemented by the same types of computers that embody SCPs. In addition to the computing capability and data base maintenance features, service nodes use ISDN lines and may include DTMF signal recognition devices, tone generation devices, voice synthesis devices, text-to-speech devices and other voice or data resources. While service nodes are physically quite similar to SCPs, there are some important differences in their uses.

Service control points normally implement high volume routing or screening services, such as call forwarding and 800 number translation and routing. They are also used for maintenance of and providing access to high volume databases for authorization of billing, such as credit card number validations. In most local exchange carrier networks, service control points are only used for database look-up and routing services that take place prior to the logical completion of the call, i.e., the provision of a ringing signal to the called subscriber line and ring back to the calling subscriber. By contrast, service nodes are used principally when some custom feature or service is needed that requires an audio connection to the call or transfer of a significant amount of data to a subscriber over a switched connection during or following a call.

Additional devices for implementing advanced network functions within the AIN 100 are provided by regional STPs (not shown), regional SCPs (not shown), and a service management system (SMS) 46. The STP 34 is connected to the SSPs via connections 36, 38 and 40. Both the regional SCPs and the local SCP 42, which represent a plurality of local SCPs distributed throughout the AIN 100, are connected via respective data links to the SMS 46. The SMS 46 provides a centralized platform for remotely programming the various SCPs of the AIN 100 so that a coordinated information processing scheme may be implemented for the AIN 100. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The SCP 42 is also connected to a caller ID with name (CNAM) database 246. The CNAM database comprises a plurality of directory numbers along with associated names for the directory numbers. The CNAM database may be used to provide look-up database to provide caller ID service. The CNAM database may comprise directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

For preparation of billing information, the subscriber's telecommunications service provider is generally responsible for maintaining records for both local and long distance wireline and wireless services and producing billing statements for individual subscribers. The billing system 50, otherwise known as a call accounting system, includes computer systems, memory storage, software, and some mechanical methods for connection to the telephone network described with respect to FIG. 1. A billing system 50 is used to record information about the telephone calls, organize that information, and upon being asked, prepare statements related to subscriber use of telephone services. The information recorded or captured about telephone calls includes all information required to prepare periodic billing statements to subscribers for use of telephone services. Representative information includes type, date, time, duration, originating point and terminating point for telephone calls combined with subscriber information such as calling plan information, discounts provided to a subscriber, and the like.

The billing system 50 produces these billing statements, which are typically mailed to subscribers on a periodic basis. Information may be downloaded from the SSP 12 to the billing system 50 in association with the preparation of the billing statements. The operation of a billing system of a telecommunications service provider, such as the billing system 50, is well-known to those skilled in the art.

It will be appreciated that the billing system 50 may prepare records for each subscriber on a per communication basis. These per communication records for a particular subscriber are typically created by the originating switch that serves the subscriber's line. Preferably, the AIN central office switches, such as SSP 12, create call detail records (CDR) that contain information on outgoing and incoming phone calls, including originating and terminating parties, originating and terminating destination, time of day, day of the week, duration of the call, type of call (wireline or wireless), and the like. Additionally, the call detail records typically contain call disposition information (e.g. answered, busy, etc.). The per communication call detail records created by the SSP 12 for the subscriber line 18 are periodically downloaded to the billing system 50 on a non-real time basis. The billing system 50 computes the costs for the communications represented by the various records and prepares billing statements to be mailed to the subscribers.

The wireless network 150, such as a cellular network, comprises a mobile switching center (MSC) 52. The MSC 52 is a switch providing services and coordination between wireless user in network 50 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR) similar to the above-described AIN SSPs. The call detail records created by the MSCs are transmitted to the billing system 50 for preparation of periodic wireless subscriber billing.

The MSC 52 may also be connected to a home location register (HLR) 56. The HLR is an SS7 database used to identify/verify a wireless subscriber. The HLR also comprises data related to features and services the wireless subscriber has. The HLR is also used during roaming to verify the legitimacy of the subscriber and to provide them with their subscribed features. The HLR 56 may also be connected to the STP 34 and/or SCP 42 of the wireline network. In certain embodiments of the present invention, such as when the calling party is a wireless phone customer, the HLR may be used to provide the calling party's name and calling party's number for the caller ID service.

Figure 2:
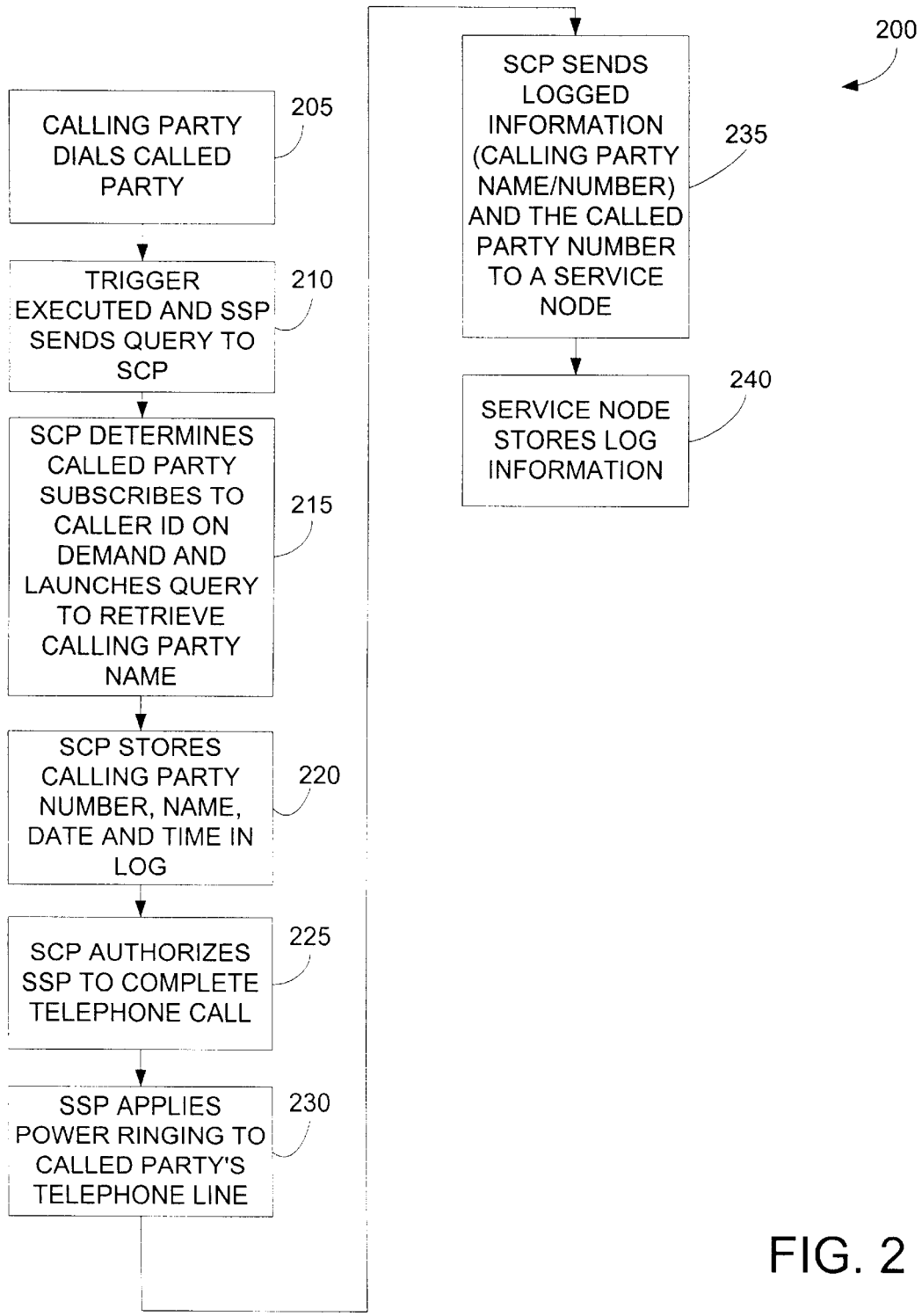
FIG. 2 is a flow diagram illustrating a method for logging incoming calls in accordance with an embodiment of the present invention.

Referring now to FIG. 2, a flow diagram 200 illustrating the steps of a method for logging incoming calls in accordance with an embodiment of the present invention will be described. It should be understood that the flow diagram 200 relates to a method performed when calling parties place a telephone call to a called party. The calling party name and/or telephone number is logged so that the called party may later retrieve them using an on-demand caller ID service in accordance with an embodiment of the present invention.

The method 200 begins at step 205 when a calling party dials a called party to place a telephone call to the called party. At step 210, an advanced intelligent network (AIN) terminating attempt trigger (TAT) is triggered at the terminating SSP and the terminating SSP sends a TAT query with calling party number and called party number information to the SCP associated with the terminating SSP. Typically, the terminating SSP is the SSP associated with the called party's telephone line.

At step 215, the SCP determines that the called party subscribes to a caller ID on demand service and the SCP uses the calling party's number to launch a query to retrieve the calling party's name from the CNAM database. It should be understood that typically, to reduce workload in the network, the calling party's name and calling party's number will be logged only if the called party is a subscriber to caller ID on demand service. However, in other embodiments of the invention, a subscription to caller ID on demand service is not required and the calling party's name and number for every called party may be logged.

At step 220, the SCP temporarily stores the calling party's number, the calling party's name, the date of the telephone call and the time of the telephone call in a called party's log. At step 225, the SCP sends an authorize termination to the terminating SSP instructing the terminating SSP to complete the telephone call.

At step 230, the terminating SSP applies power ringing to the called party's telephone line to cause the called party's telephone to ring. If the called party also subscribes to regular caller ID service, then a second query (such as a CNAM TR-1188 TCAP query) is sent to the SCP to retrieve the calling party name associated with the calling party number. The caller ID information (calling party name and calling party number) is sent along with the power ringing.

At step 235, the SCP sends the logged information (calling party name and calling party number) and the called party number to a service node (SN) such as via TCP/IP or another connection. At step 240, the service node stores the called party's log information in a log associated with the called party's telephone number. The called party's log may then be located using the called party's telephone number. Thus, it should be understood from the foregoing description that the method 200 described in reference to FIG. 2 may be used to log calling party information (calling party number and/or calling party name) for a called party's telephone number.

Figure 3:
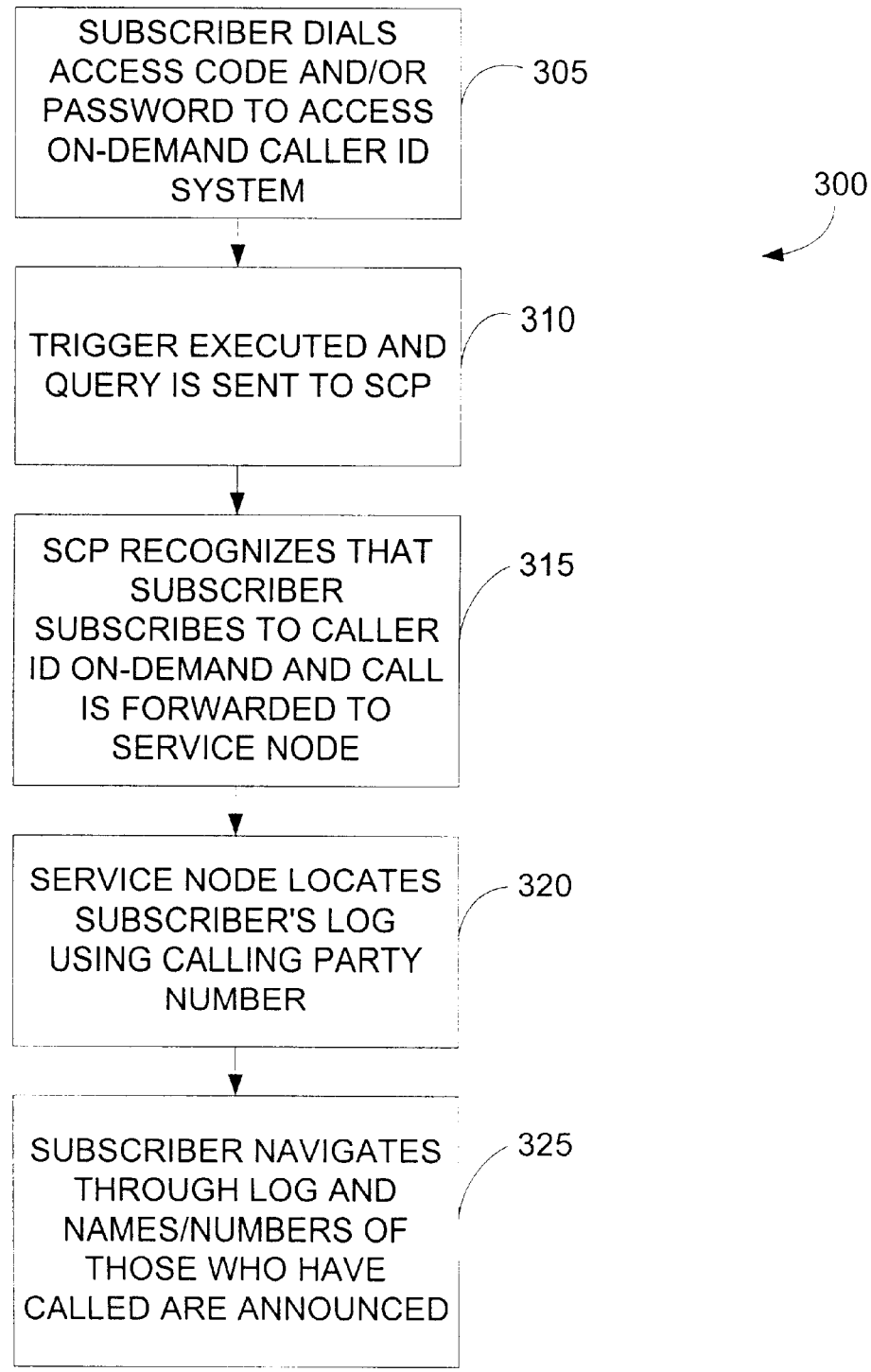
FIG. 3 is a flow diagram illustrating a method for retrieving logged incoming calls in accordance with an embodiment of the present invention.

Referring now to FIG. 3, a flow diagram illustrating the steps of a method 300 for retrieving logged incoming calls in accordance with an embodiment of the present invention will be described. It should be understood that typically the method 300 is performed after the incoming calls have been logged such as via the method 200 (FIG. 2).

At step 305, the subscriber dials an access code and, in some embodiments, enters a password to access an on-demand caller ID system. The subscriber refers to a user who wants to access the calling party names and calling party numbers for a called party number. The subscriber may be the called party discussed in reference to FIG. 2.

At step 310, a custom dialing plan (CDP) trigger or public office dialing plan plan feature code (PODP FC) trigger is triggered and a query with the access code and the subscriber's number is sent to an SCP associated with the subscriber telephone. At step 315, the SCP recognizes (based on the subscriber's number) that the subscriber subscribes to caller ID on demand and forwards the call to a service node using a specific service node access number.

At step 320, after the call is sent to the service node, the service node uses the subscriber's number to locate the subscriber's log. Because the subscriber's number matches a specific service node access number, the SN will provide "passcodeless" service. That is, if the subscriber is calling from his or her home or business telephone, the SCP may pass this information to the service node. The service node may then provide the caller ID on demand log information without requiring the subscriber to enter a passcode. According to another embodiment, the system may be set up to allow the subscriber to access the caller ID on demand log information with entry of a passcode at step 305.

At step 325, the subscriber navigates through the log using touch tones and the names and/or numbers of those who have called the subscriber are announced using text-to-speech technology. For example, the service node may play an announcement to the subscriber such as "On demand caller identification . . . press 1 to hear the last caller, press 2 to hear all callers." The subscriber may be allowed to delete, skip, replay and search for log entries or set a passcode, among other features.

Figure 4:
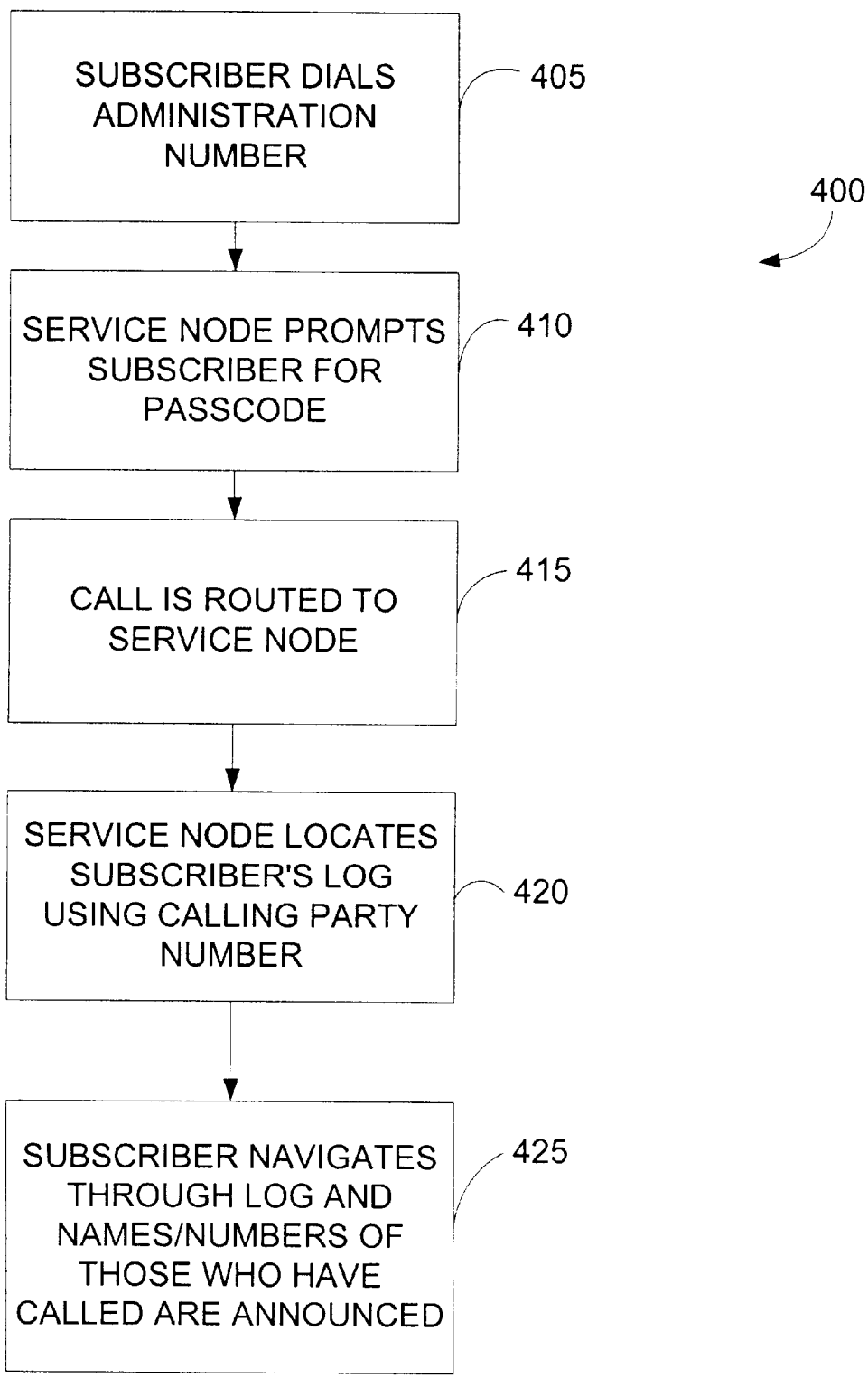
FIG. 4 is a flow diagram illustrating a method for remotely retrieving logged incoming calls remotely in accordance with an embodiment of the present invention.

Referring now to FIG. 4, a flow diagram illustrating the steps of a method 400 for remotely retrieving logged incoming calls in accordance with an embodiment of the present invention will be described. At step 405, the subscriber dials an administration number from a remote telephone (not the subscriber's home or business telephone) such as a wireless telephone, pay phone, or the phone of a friend. According to an embodiment, the administration number may be a number designated for connecting a subscriber from a remote telephone to the caller ID on demand functionality of the present invention. Based on the dialed administration number, a query to the SCP is generated from a switch associated with the telephone number and telephone in use by the subscriber.

At the SCP, a look-up for the subscriber's home or business telephone number is made based on the administration number entered by the subscriber. If no matching directory number is found, the subscriber may be prompted to re-enter the administration number. After a set number of attempts without successfully entering the correct administration number, the subscriber's call is disconnected. At step 410, if a valid subscriber directory number is received in response to the look-up by the SCP, the subscriber is prompted for a passcode to verify that the subscriber may have access to the log of caller ID information. Alternatively, the system may be set up to allow access without a passcode based only on a valid subscriber directory number associated with the administration number entered by the subscriber.

Referring back to step 405, according to an alternate embodiment, the subscriber may dial a caller ID on demand access code as discussed with reference to FIG. 3 from the remote telephone. In response, the access code is passed to the SCP which in turn looks up the subscriber's telephone directory number associated with the calling ID on demand service. If the access code entered by the subscriber is a valid access code and matches with the subscriber's telephone directory number to associate the telephone directory number with the caller ID on demand service, the subscriber may then be prompted to enter a passcode to gain access to the caller on demand service. Alternatively, as described above, the system may allow the subscriber to gain access to the caller ID on demand service without entry of a passcode. If the access code entered by the subscriber does not correspond with authorized access to the caller ID on demand service, the SCP may perform a database look-up for a telephone directory number associated with the access code entered by the subscriber. If no valid telephone directory number is found, the subscriber may be prompted to enter a subscriber telephone directory number for use by the SCP in determining whether the subscriber may gain access to the caller ID on demand service, as described above.

At step 410, if under either embodiment described above the subscriber access to the caller ID on demand service is validated, the method proceeds to step 415 and the call is routed to the service node for location of the log of caller ID information associated with the subscriber's directory number or access code. At step 420, the service node queries the SCP for the caller ID log via a TCP/IP connection using the subscriber's directory number for accessing the appropriate caller ID log. In response, the SCP sends the caller ID log information to the service node for presentation to the subscriber.

At step 425, the service node may play an announcement to the subscriber such as "On demand caller identification . . . press 1 to hear the last caller, press 2 to hear all callers." The subscriber may then navigate through the log and name/numbers to obtain information on previous callers. According to one embodiment, the service node may use prompts to allow the caller to delete, skip, replay and search for log entries or make changes in the subscriber's passcode. The service node may use text-to-speech technology to announce the names and numbers associated with calling parties who have called the subscriber.

It should be understood that typically the service node will store a log only for a limited period of time due to storage constraints. Thus, the logs may be periodically edited to remove certain call information. For example, the on-demand caller ID system may store information only for calls made during the last twenty-four hours. It should also be understood that the on-demand caller ID service may be charged on a periodic subscription basis or on a per usage basis. On a per usage basis, information is sent from the service node to the billing system whenever the user accesses the on-demand caller ID system.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. In a telecommunications system, a method for logging calling party information for incoming telephone calls to a telephone line and storing the calling party information for later retrieval, the method comprising the steps of:

receiving an incoming telephone call at a telephone line of a called party;

triggering an advanced intelligent network (AIN) terminating attempt trigger (TAT) at a terminating central office switch (SSP) associated with the telephone line;

sending a TAT query with a calling party number associated with the incoming telephone call and a called party number associated with the telephone line of the called party to a service control point (SCP) associated with the terminating SSP;

determining, at the SCP, that the called party subscribes to a caller ID on demand service and, if so, then using the calling party number associated with the incoming telephone call to launch a query to retrieve a calling party name from a caller ID with name CNAM database;

storing the calling party information for the incoming telephone call at the SCP;

after storing the calling party information for the incoming telephone call at the SCP, receiving a call from a subscriber to the calling party information;

receiving an access code from the subscriber wherein the access code is associated with the on-demand caller ID service;

executing a trigger and sending a query with a subscriber number to an SCP associated with a subscriber telephone;

recognizing at the SCP based on the subscriber number that the subscriber subscribes to the caller ID on demand service;

routing the call from the subscriber to a service node;

locating the stored calling party information based on the subscriber number;

sending the stored calling party information to the service node; and providing the calling party information to the subscriber.

2. The method of claim 1 wherein the calling party information comprises the calling party's number, the calling party's name, a date of the telephone call and a time of the telephone call.

3. The method of claim 2 further comprising the step of sending an authorize termination from the SCP to the terminating SSP instructing the terminating SSP to complete the telephone call.

4. The method of claim 3 further comprising the step of causing the terminating SSP to apply power ringing to the called party's telephone line to cause the called party's telephone to ring.

5. The method of claim 4, further comprising the step of determining whether the called party subscribes to regular caller ID service, and if so, then sending a second query to the SCP to retrieve the calling party name associated with the calling party number and sending the calling party name and calling party number with the power ringing.

6. The method of claim 5 wherein the second query comprises a CNAM TR-1188 TCAP query.

7. The method of claim 1, wherein the calling party information is sent to the service node via a TCP/IP connection.

8. The method of claim 1, further comprising the step of storing the calling party information at the service node.

9. The method of claim 8, wherein the calling party information is stored at the service node in a log associated with the called party telephone number.

10. The method of claim 1, further comprising the step of receiving a passcode with the access code to access the on-demand caller ID system.

11. The method of claim 10 wherein the access code and passcode are received from a subscriber who wants to access his calling party information.

12. The method of claim 1, wherein the trigger is a custom dialing plan (CDP) trigger.

13. The method of claim 1, wherein the trigger is a public office dialing plan feature code (PODP FC).

14. The method of claim 1, wherein the calling party information is stored in a called party information log at the SCP.

15. In a telecommunications system, a method for logging calling party information for incoming telephone calls to a telephone line and storing the calling party information for later retrieval, the method comprising the steps of:

receiving an incoming telephone call at a telephone line of a called party;

triggering an advanced intelligent network (AIN) terminating attempt trigger (TAT) at a terminating central office switch (SSP) associated with the telephone line;

sending a TAT query with a calling party number associated with the incoming telephone call and a called party number associated with the telephone line of the called party to a service control point (SCP) associated with the terminating SSP;

determining, at the SCP, that the called party subscribes to a caller ID on demand service and, if so, then using the calling party number associated with the incoming telephone call to launch a query to retrieve a calling party name from a caller ID with name (CNAM) database;

storing the calling party information for the incoming telephone call at the SCP;

after storing the calling party information for the incoming telephone call at the SCP, receiving a call from a subscriber to the calling party information whereby the call is initiated from a telephone number different from a subscriber number;

receiving an administration number from the subscriber whereby the administration number is associated with the on-demand caller ID service;

executing a trigger and sending a query with the administration number to an SCP associated with a subscriber telephone;

at the SCP, finding the subscriber number associated with the calling party information based on the administration number;

routing the call from the subscriber to a service node;

locating the stored calling party information based on the subscriber number; and providing the stored calling party information to the subscriber.

16. The method of claim 15, whereby the step of locating the stored calling party information based on the subscriber number, further comprises the steps of:

querying the SCP from the service node for the calling party information; and sending the calling party information to the service node for provision to the subscriber.

17. The method of claim 15, wherein the calling party information is stored in a called party information log at the SCP.

18. In a telecommunications system, a method for logging calling party information for incoming telephone calls to a telephone line and storing the calling party information for later retrieval, the method comprising the steps of:

receiving an incoming telephone call at a telephone line of a called party;

triggering an advanced intelligent network (AIN) terminating attempt trigger (TAT) at a terminating central office switch (SSP) associated with the telephone line;

sending a TAT query with a calling party number associated with the incoming telephone call and a called party number associated with the telephone line of the called party to a service control point (SCP) associated with the terminating SSP;

determining, at the SCP, that the called party subscribes to a caller ID on demand service and, if so, then using the calling party number associated with the incoming telephone call to launch a query to retrieve a calling party name from a caller ID with name (CNAM) database;

storing the calling party information for the incoming telephone call at the SCP;

after storing the calling party information for the incoming telephone call at the SCP, receiving a call from a subscriber to the calling party information whereby the call is initiated from a telephone number different from a subscriber number;

receiving an access code from the subscriber wherein the access code is associated with the on-demand caller ID service;

executing a trigger and sending a query with the access code to an SCP associated with a subscriber telephone;

at the SCP, finding a subscriber number associated with the calling party information based on the access code;

routing the call from the subscriber to a service node;

locating the stored calling party information based on the subscriber number;

sending the stored calling party information to the service node; and providing the calling party information to the subscriber.

19. The method of claim 18, whereby if a subscriber number associated with the calling party information is not found at the SCP based on the access code, then prompting the subscriber for the subscriber number.

20. The method of claim 18, wherein the calling party information is stored in a called party information log at the SCP.

21. A system for logging calling party information for incoming telephone calls to a telephone line and storing the calling party information for later retrieval, the system comprising:

a switch operative
to receive an incoming telephone call from a calling party to a called party;
to trigger and send a terminating attempt trigger (TAT) query with a calling party number and called party number information to a service control point (SCP) associated with the switch;

the SCP operative
  to determine that the called party subscribes to a caller ID on demand service and, if so, to use the calling party number associated with the incoming telephone call to launch a query to retrieve a calling party name from a caller ID with name CNAM database;
  to store the calling party information for the incoming telephone call;
the switch further operative
  to receive a call from a subscriber to the calling party information after the calling party information for the incoming telephone call is stored;
  to receive an access code from the subscriber wherein the access code is associated with the on-demand caller ID service;
  to execute a trigger and send a query with a subscriber number to an SCP associated with a subscriber telephone;
the SCP further operative
  to recognize based on the subscriber number that the subscriber subscribes to the caller ID on demand service;
  to route the call to a service node;
  to locate the stored calling party information based on the subscriber number;
  to send the stored calling party information to the service node; and
the service node operative to provide the calling party information to the subscriber.

22. The system of claim 21, wherein the calling party information is stored in a called party information log at the SCP.

23. A system for logging calling party information for incoming telephone calls to a telephone line and storing the calling party information for later retrieval, the system comprising:
  a switch operative
    to receive an incoming telephone call from a calling party to a called party;
    to trigger and send a terminating attempt trigger (TAT) query with a calling party number and called party number information to a service control point (SCP) associated with the switch;
  the SCP operative
    to determine that the called party subscribes to a caller ID on demand service and, if so, to use the calling party number associated with the incoming telephone call to launch a query to retrieve a calling party name from a caller ID with name (CNAM) database;
    to store the calling party information for the incoming telephone call;
  the switch further operative
    to receive a call from a subscriber to the calling party information whereby the call is initiated from a telephone number different from a subscriber number;
    to receive an administration number from the subscriber whereby the administration number is associated with the on-demand caller ID service;
    to execute a trigger and send a query with the administration number to an SCP associated with a subscriber telephone;
  the SCP further operative
    to find the subscriber number associated with the calling party information based on the administration number;
    to route the call to a service node;
    to locate the stored calling party information based on the subscriber number;
    to send the stored calling party information to the service node; and
  the service node operative to provide the calling party information to the subscriber.

24. The system of claim 23, wherein the calling party information is stored in a called party information log at the SCP.

25. A system for logging calling party information for incoming telephone calls to a telephone line and storing the calling party information for later retrieval, the system comprising:
  a switch operative
    to receive an incoming telephone call from a calling party to a called party;
    to trigger and send a terminating attempt trigger (TAT) query with a calling party number and called party number information to a service control point (SCP) associated with the switch;
  the SCP operative
    to determine that the called party subscribes to a caller ID on demand service and, if so, to use the calling party number associated with the incoming telephone call to launch a guery to retrieve a calling party name from a caller ID with name (CNAM) database;
    to store the calling party information for the incoming telephone call;
  the switch further operative
    to receive a call from a subscriber to the calling party information whereby the call is initiated from a telephone number different from a subscriber number;
    to receive an access code from the subscriber wherein the access code is associated with the on-demand caller ID service;
    to execute a trigger and send a query with the access code to an SCP associated with a subscriber telephone;
  the SCP further operative
    to find a subscriber number associated with the calling party information based on the access code;
    to prompt the subscriber for the subscriber number if the subscriber number associated with the calling party information is not found at the SCP based on the access code;
    to route the call to a service node;
    to locate the stored calling party information based on the subscriber number;
    to send the stored calling party information to the service node; and
  the service node operative to provide the calling party information to the subscriber.

26. The system of claim 25, wherein the calling party information is stored in a called party information log at the SCP.

* * * * *

UNITED STATES PATENT AND TRADEMARK OFFICE
CERTIFICATE OF CORRECTION

PATENT NO.    : 6,785,368 B1
DATED         : August 31, 2004
INVENTOR(S)   : Eason et al.

It is certified that error appears in the above-identified patent and that said Letters Patent is hereby corrected as shown below:

Column 3,
Line 67, "to provide look-up" should read -- to provide a look-up --

Column 6,
Line 22, "dialing plan plan feature" should read -- dialing plan feature --

Column 12,
Line 31, "guery to retrieve" should read -- query to retrieve --

Signed and Sealed this

Seventh Day of December, 2004

JON W. DUDAS
*Director of the United States Patent and Trademark Office*